United States Patent

Tom

[11] Patent Number: 6,110,257
[45] Date of Patent: Aug. 29, 2000

[54] LOW CONCENTRATION GAS DELIVERY SYSTEM UTILIZING SORBENT-BASED GAS STORAGE AND DELIVERY SYSTEM

[75] Inventor: Glenn M. Tom, New Milford, Conn.

[73] Assignee: Advanced Technology Materials, Inc., Danbury, Conn.

[21] Appl. No.: 09/080,705

[22] Filed: May 18, 1998

Related U.S. Application Data

[60] Provisional application No. 60/046,780, May 16, 1997.

[51] Int. Cl.$^7$ .................................................. B01D 53/04
[52] U.S. Cl. ...................... 95/22; 95/45; 95/95; 95/106; 95/133; 96/4; 96/10; 96/113; 96/144; 96/147
[58] Field of Search ................................. 95/19, 22, 23, 95/43, 45, 90, 95, 103, 106, 133; 96/4, 10, 108, 113, 143, 144, 147

[56] References Cited

U.S. PATENT DOCUMENTS

| | | | |
|---|---|---|---|
| 3,651,618 | 3/1972 | Klein et al. | 95/44 |
| 3,939,858 | 2/1976 | LeMay | 137/90 |
| 4,531,398 | 7/1985 | Di Benedetto et al. | 73/1 |
| 4,723,967 | 2/1988 | Tom | 95/263 X |
| 4,738,693 | 4/1988 | Tom | 95/90 |
| 4,936,877 | 6/1990 | Hultquist et al. | 55/16 |
| 5,151,395 | 9/1992 | Tom | 502/67 |
| 5,518,528 | 5/1996 | Tom et al. | 95/103 |
| 5,704,967 | 1/1998 | Tom et al. | 96/143 |
| 5,705,965 | 1/1998 | Tom et al. | 95/95 |
| 5,707,424 | 1/1998 | Tom et al. | 95/127 X |
| 5,761,910 | 6/1998 | Tom | 95/95 X |
| 5,837,027 | 11/1998 | Olander et al. | 95/133 X |

FOREIGN PATENT DOCUMENTS 0555802 8/1993 European Pat. Off. ................... 95/45

*Primary Examiner*—Robert H. Spitzer
*Attorney, Agent, or Firm*—Steven J. Hultquist; William A. Barrett; Oliver A. M. Zitzmann

[57] ABSTRACT

A low concentration gas delivery system utilizing a sorbent-based gas storage and delivery unit including a gas storage and dispensing vessel joined in flow communication with a permeation structure. The storage and dispensing vessel contains a solid-phase physical sorbent medium holding a fluid, which is selectively dispensed from the vessel by pressure differential, concentration differential and/or thermal desorption techniques. The dispensed gas flows to the permeation structure, wherein the desorbed fluid is diffusionally released either as a neat fluid, or into a carrier gas in which the desorbed fluid has a precisely maintained concentration, for applications such as calibration of instruments monitoring fluid concentrations, delivery of dopants for fabrication of microelectronic device structures, or other end use application requiring a precise low concentration of fluid.

16 Claims, 2 Drawing Sheets

LOW CONCENTRATION GAS DELIVERY SYSTEM UTILIZING SORBENT-BASED GAS STORAGE AND DELIVERY SYSTEM

CROSS-REFERENCE TO RELATED APPLICATION

This application is based on and claims the priority of U.S. Provisional Patent Application No. 60/046,780 filed May 16, 1997 in the name of Glenn M. Tom for "Low Concentration Gas Delivery System Utilizing Sorbent-Based Gas Storage and Delivery System."

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to a system for delivering fluids, especially gases, at precise low concentrations, for applications such as calibration, dopant delivery in semiconductor manufacturing, etc.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

In many industrial applications, there exists a need to deliver precise low concentrations of fluid, e.g., gas, to a process system for use therein. Examples include the calibration of instruments monitoring fluid concentrations, delivery of dopants for microelectronics applications such as semiconductor manufacturing, etc.

It is an object of the invention to provide an improved system for such applications.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel.

A solid-phase physical sorbent medium having a sorptive affinity for the fluid is disposed in the storage and dispensing vessel at an interior gas pressure. The sorbable fluid is physically adsorbed on the sorbent medium.

Means are provided for discharging desorbed fluid from the storage and dispensing vessel. Such means may for example comprise a dispensing assembly coupled in gas flow communication with the storage and dispensing vessel. The dispensing assembly may be constructed and arranged for selective on-demand dispensing of desorbed fluid after thermal, concentration differential- and/or pressure differential-mediated desorption of the fluid from the sorbent material. The dispensing assembly may be constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

The sorbent medium in the storage and dispensing system may include any suitable sorbent material. Preferred substrates include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kureha Corporation of America, New York, N.Y.

Although carbon sorbents and molecular sieve materials such as crystalline aluminosilicates are preferred in many instances, the solid-phase physical sorbent medium may usefully comprise other materials such as silica, alumina, macroreticulate polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

More particularly, the present invention relates to a fluid delivery system comprising a sorbent-based fluid storage and dispensing system, of the type described above, arranged for selectively desorbing the fluid from the sorbent material, and flowing the desorbed fluid to a permeation structure arranged to diffusionally pass the desorbed fluid, either as a neat fluid into a vacuum chamber, or into a carrier gas flowed over the permeation structure, wherein the desorbed fluid has a precise low concentration for subsequent use.

The fluid delivery system of the invention may utilize pressure, temperature, and flow rate monitoring and control means to controllably maintain the concentration of the final product gas at a desired level.

Other aspects and features of the invention will be more fully apparent from the ensuing disclosure.

DETAILED DESCRIPTION OF THE INVENTION, AND PREFERRED EMBODIMENTS THEREOF

The disclosures of the following U.S. patents and U.S. patent applications are hereby incorporated herein by reference in their entirety:

U.S. Patent application Ser. No. 08/809,019 filed Apr. 11, 1997, now U.S. Pat. No. 5,935,305;

U.S. Pat. No. 5,518,528 issued May 21, 1996;

U.S. Pat. No. 5,704,965 issued Jan. 6, 1998;

U.S. Pat. No. 5,704,967 issued Jan. 6, 1998;

U.S. Pat. No. 5,707,424 issued Jan. 13, 1998;

U.S. Patent application Ser. No. 08/859,172 filed May 20, 1997, now U.S. Pat. No. 5,761,910; and U.S. Patent application Ser. No. 09/002,278 filed Dec. 31, 1997.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
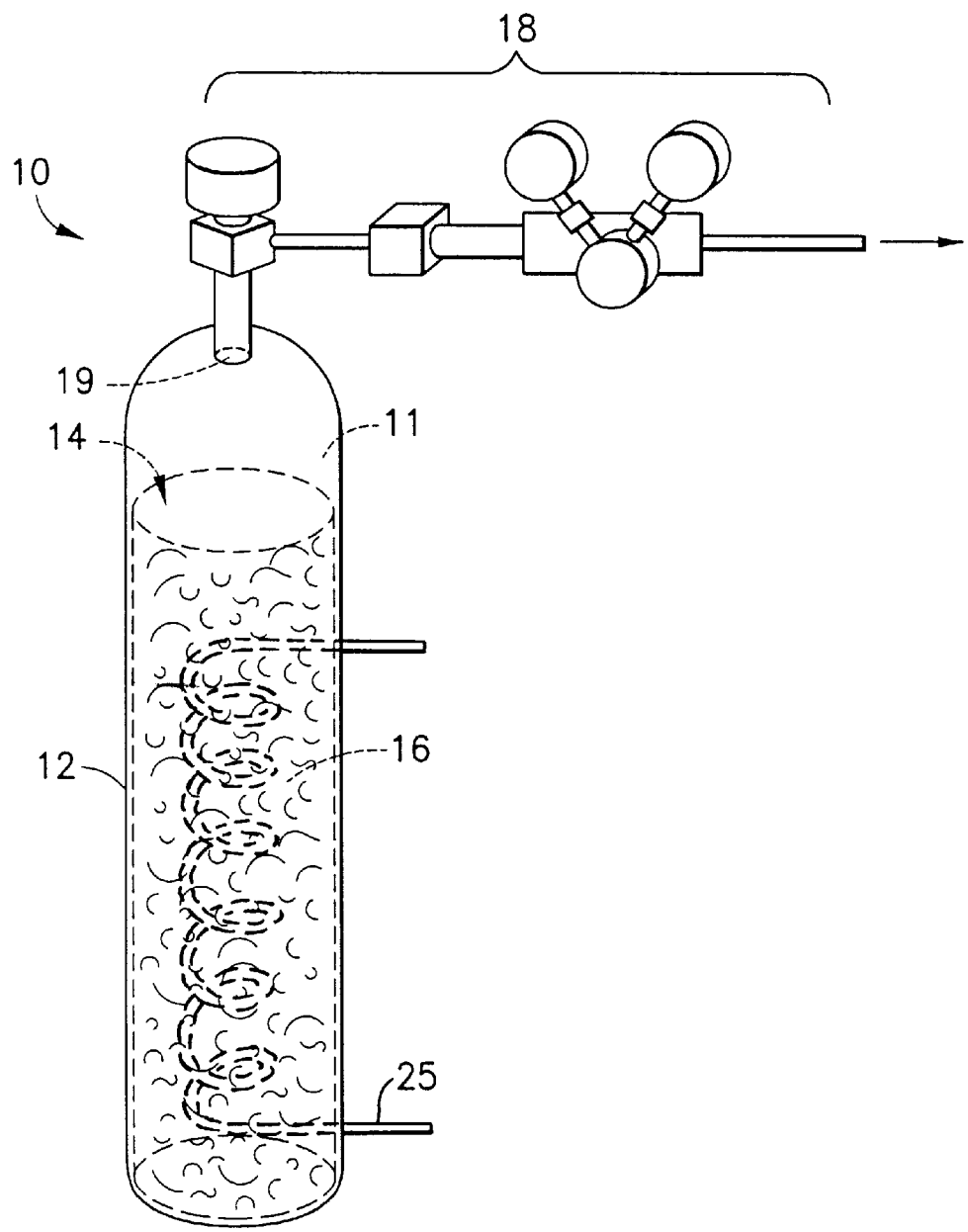
FIG. 1 is a schematic perspective representation of a storage and dispensing vessel and associated flow circuitry according to one embodiment of the invention, which may be usefully employed for the storage and dispensing of fluid.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may be provided with internal heating means such as heating coil 25 to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be accompanied by a concentration differential, or a concentration differential alone may be employed to effect desorption for release of the sorbate fluid from the solid-phase physical sorbent medium.

A pressure differential for effecting desorption of gas from the physical sorbent medium may be established by flow communication between the storage and dispensing vessel, on the one hand, and the exterior dispensing environment or locus of use, on the other. The pressure differential may be provided by a lower pressure dispensing environment or locus of use, such as ion implantation.

Alternatively, motive fluid driver means may be employed to effect extraction of the fluid from the physical sorbent medium and discharge of the desorbed fluid from the vessel. Such motive fluid driver means include blowers, fans, turbines, compressors, pumps, ejectors, eductors, cryopumps, vacuum extractors, etc. Such means for discharging desorbed fluid from the vessel may be used in combination with other elements such as conduits, piping, manifolding, tubing, flow control valves, mass flow controllers, etc.

The sorbent medium 16 may comprise any suitable material having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The sorbent may be provided in the form of particles, granules, extrudates, powders, cloth, web materials, honeycomb or other monolithic forms, composites, or other suitable conformations of useful sorbent materials, having sorptive affinity for the fluid sought to be stored and subsequently dispensed, and satisfactory desorption characteristics for the dispensing operation.

As mentioned, although it generally is preferred to operate solely by pressure differential and/or concentration differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

Figure 2:
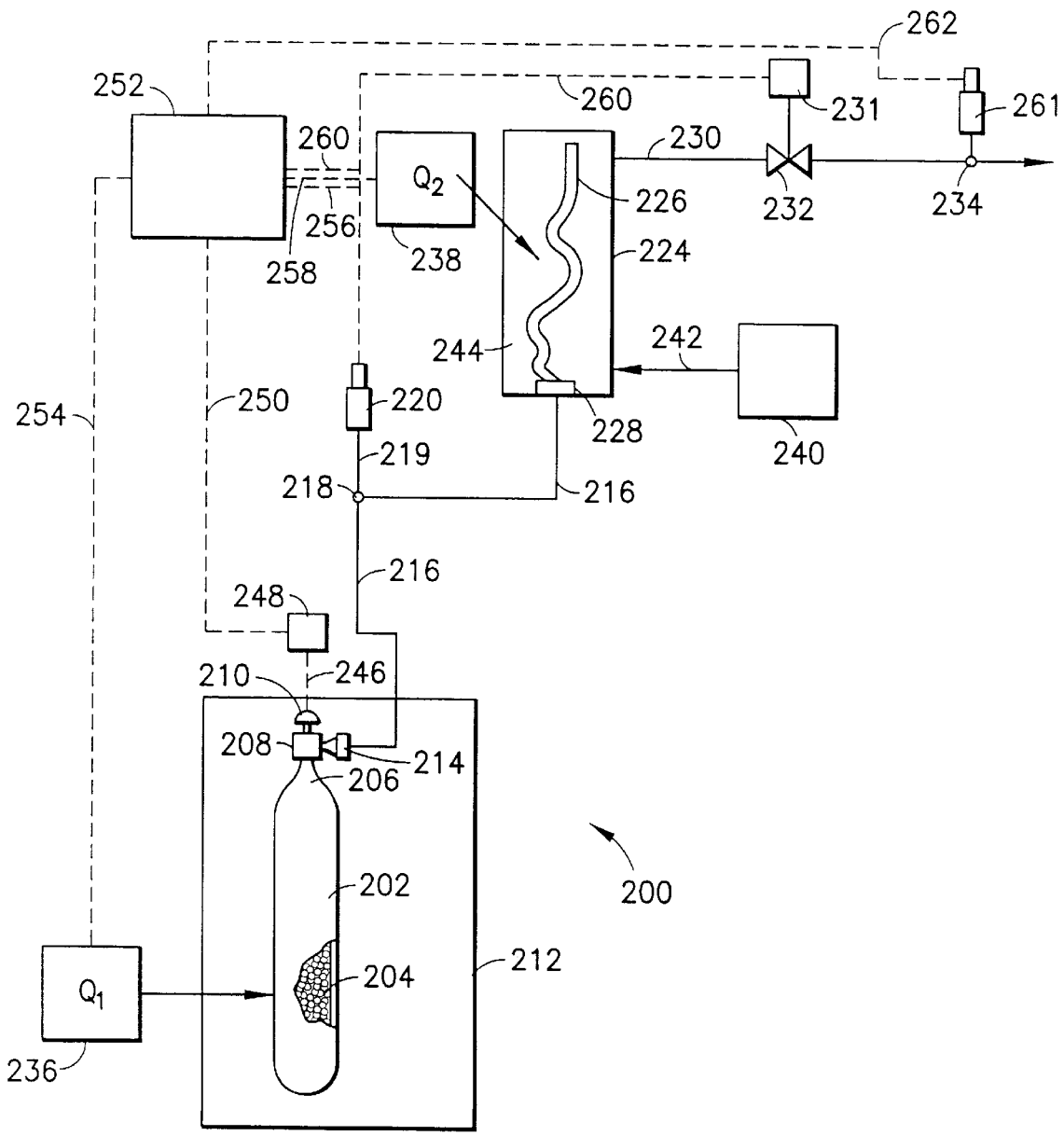
FIG. 2 is a schematic representation of a fluid delivery system according to one illustrative embodiment of the present invention.

FIG. 2 is a schematic representation of a fluid delivery system 200 according to one embodiment of the invention.

The system 200 comprises a fluid storage and delivery vessel 202 containing a bed of suitable sorbent material 204 having sorptive affinity and suitable release properties for the fluid to be dispensed. The vessel 202 is joined at its neck 206 to a valve head 208 including valve handle 210, and valve head outlet 214 discharging desorbed fluid into line 216 when the valve is open by selective adjustment of handle 210.

The discharge line 216 is joined to a permeation tube 226 by means of connector 228, with the permeation tube being mounted in permeate dispensing chamber 224 containing an interior volume 244 for receiving the fluid released by diffusion through the walls of the permeation tube 226. The permeation tube may be of a conventional type, comprising a porous Teflon® hollow tube which is gas-permeable for diffusional release of the fluid to be dispensed.

The permeate dispensing chamber 224 may as shown be in fluid flow communication by means of line 242 with a source 240 of carrier fluid, for entrainment and mixing with the permeate fluid released from the permeation tube in chamber 224. The resulting mixed fluid stream containing the permeate component is discharged from chamber 224 in line 230 and flowed to the doping chamber, instrument calibration fluid reservoir, or other end use means and process system.

The vessel 202 may be constructed and arranged for dispensing of fluid by pressure differential, with low or vacuum pressure being maintained in chamber 224. Additionally, or alternatively, the vessel 202 may be disposed in the chamber 212 for heating thereof by heater 236, which provides a selected heat flux $Q_1$ to chamber 212. As a still further option, the dispensing may be carried out under a concentration differential, to effect transfer of the desorbed fluid from the vessel 202 to the permeation tube 226.

In like manner, the chamber 224 containing the permeation tube may be maintained at ambient temperature, or alternatively may be heated by heater 238, which is arranged to provide input of heat flux $Q_2$ to the chamber 224, to controllably achieve or maintain a desired diffusional rate of efflux of fluid from the permeation tube 226.

The above-described low fluid concentration delivery system may be variously arranged to monitor and/or control the process, utilizing temperature, pressure, flow rate, and composition (concentration) sensing and/or monitoring means, arranged with instrumentation and control means to effect process control in the system in any suitable manner appropriate to the achievement of the dispensing of the fluid of low concentration or (partial) pressure for the specific implementation of the invention.

One such monitoring and control system is illustratively shown in FIG. 2. A pressure transducer 220 is coupled by means of pressure tap line 219 to coupling 218 in line 216, to monitor pressure and generate a signal correlative of such pressure level, which is passed in signal transmission line 256 to the controller 252, which may comprise suitable microprocessor or computer means. The controller responsively to the input signal from the pressure transducer 220 may send a control signal in control signal transmission line 254 to the heater 236 to controllably adjust the extent of the heating. Concurrently, or alternatively, the controller 252 may send a control signal in control signal transmission line 250 to the valve actuator module 248 which in turn sends a control signal in line 246 to the valve handle 210, comprising signal-responsive rotation means, to open or close the valve of valve head 208 to the desired appropriate extent.

The controller 252 may also send a control signal in signal transmission line 258 to the heater 238 to selectively adjust same, in response to the pressure of the fluid in line 230 which is sensed by pressure transducer 261 which is coupled by coupling 234 in operative pressure-sensing relationship to the line 230, and which sends a sensed pressure signal by signal transmission line 262 to the controller 252. The controller may also responsively adjust the flow control valve 232 in discharge line 230 by means of a control signal sent from controller 252 in control signal line 260 to the valve acuator 231.

It will be recognized that a variety of control loop and feedback schemes may be employed to controllably carry out the fluid dispensing operation in the practice of the invention, in any appropriate manner. Further, although the foregoing description has been directed to a permeation tube as the downstream dispensing means of the diffused fluid, it will be recognized that a wide variety of other means could be employed, such as membranes of various types, as well as evaporative systems, micronebulizers, etc.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A method of delivering a low concentration fluid to a process for utilization of same, said process comprising:
 providing a storage and dispensing vessel containing a solid-phase physical sorbent medium sorptively retaining thereon a fluid having sorptive affinity for the physical sorbent medium;
 selectively desorbing fluid from said physical sorbent medium and discharging same from said vessel;
 flowing the discharged fluid to a diffusional permeation structure;
 diffusing the fluid through the diffusional permeation structure; and
 discharging the diffused fluid at a selected concentration;
 controllably maintaining concentration of said diffused fluid at said selected concentration, by a controller operatively coupled with (a) means for selectively heating at least one of the vessel and diffusional permeation structure, (b) first flow control means for controlling flow of fluid from the vessel to the diffusional permeation structure, (c) second flow control means for controlling flow of diffused fluid from the diffusional permeation structure, and (d) sensing means for sensing pressure of at least one of fluid flowed from the vessel to the diffusional permeation structure and diffused fluid flowed from the diffusional permeation structure, wherein said controller is operated to adjustably control at at least one of said means (a), (b) and (c) in response to pressure sensing of said means (d).

2. A method according to claim 1, wherein said vessel is selectively heatable.

3. A method according to claim 1, wherein the diffusional permeation structure is selectively heatable.

4. A method according to claim 1, wherein a carrier gas is flowed in contact with permeated gas to entrain the permeated gas in the carrier gas for discharge from said process.

5. A fluid delivery system comprising:
 a fluid storage and dispensing vessel;
 a solid-phase physical sorbent medium disposed in said vessel for sorptively retaining thereon a fluid having sorptive affinity for said physical sorbent medium;
 a permeation chamber enclosing an interior volume and including a permeation structure joined in fluid flow communication with the fluid storage and dispensing vessel for permeation of fluid through the permeation structure to yield permeated fluid;
 means for discharging permeated fluid from said permeation chamber; and
 means for controllably maintaining concentration of said permeated fluid at a selected level, comprising a controller operatively coupled with (a) means for selectively heating at least one of the vessel and permeation chamber, (b) first flow control means for controlling flow of fluid from the vessel to the permeation chamber, (c) second flow control means for controlling flow of permeated fluid from the permeation chamber, and (d) sensing means for sensing pressure of at least one of fluid flowed from the vessel to the permeation chamber and permeated fluid flowed from the permeation chamber, wherein said controller is operatively constructed and arranged to adjustably control at at least one of said means (a), (b) and (c) in response to pressure sensing of said means (d).

6. A system according to claim 5, wherein the permeation structure comprises a diffusion tube diffusionally releasing permeated fluid into the permeation chamber.

7. A system according to claim 5, wherein said permeation chamber is joined in fluid flow communication with a carrier gas source for selective introduction of carrier gas to the diffusion chamber, so that permeated gas discharged from the diffusion chamber is entrained in said carrier gas.

8. A system according to claim 5, wherein the solid-phase physical sorbent medium comprises a sorbent material selected from the group consisting of silica, alumina, aluminosilicates, macroriticulate polymers, kieselguhr, clays, carbon, and combinations thereof.

9. A system according to claim 5, wherein the solid-phase physical sorbent medium comprises an aluminosilicate.

10. A system according to claim 5, wherein the solid-phase physical sorbent medium comprises an activated carbon sorbent.

11. A system according to claim 5, wherein the sensing means senses pressure of fluid flowed from the vessel to the permeation chamber.

12. A system according to claim 5, wherein the sensing means senses pressure of the permeated fluid flowed from the permeation chamber.

13. A system according to claim 5, wherein the fluid storage and dispensing vessel is selectively heatable.

14. A system according to claim 5, wherein the permeation chamber is selectively heatable.

15. A system according to claim 5, wherein said permeation structure comprises a diffusion tube.

16. A system according to claim 5, wherein said permeation structure comprises a diffusion membrane.

* * * * *